Figure 10:
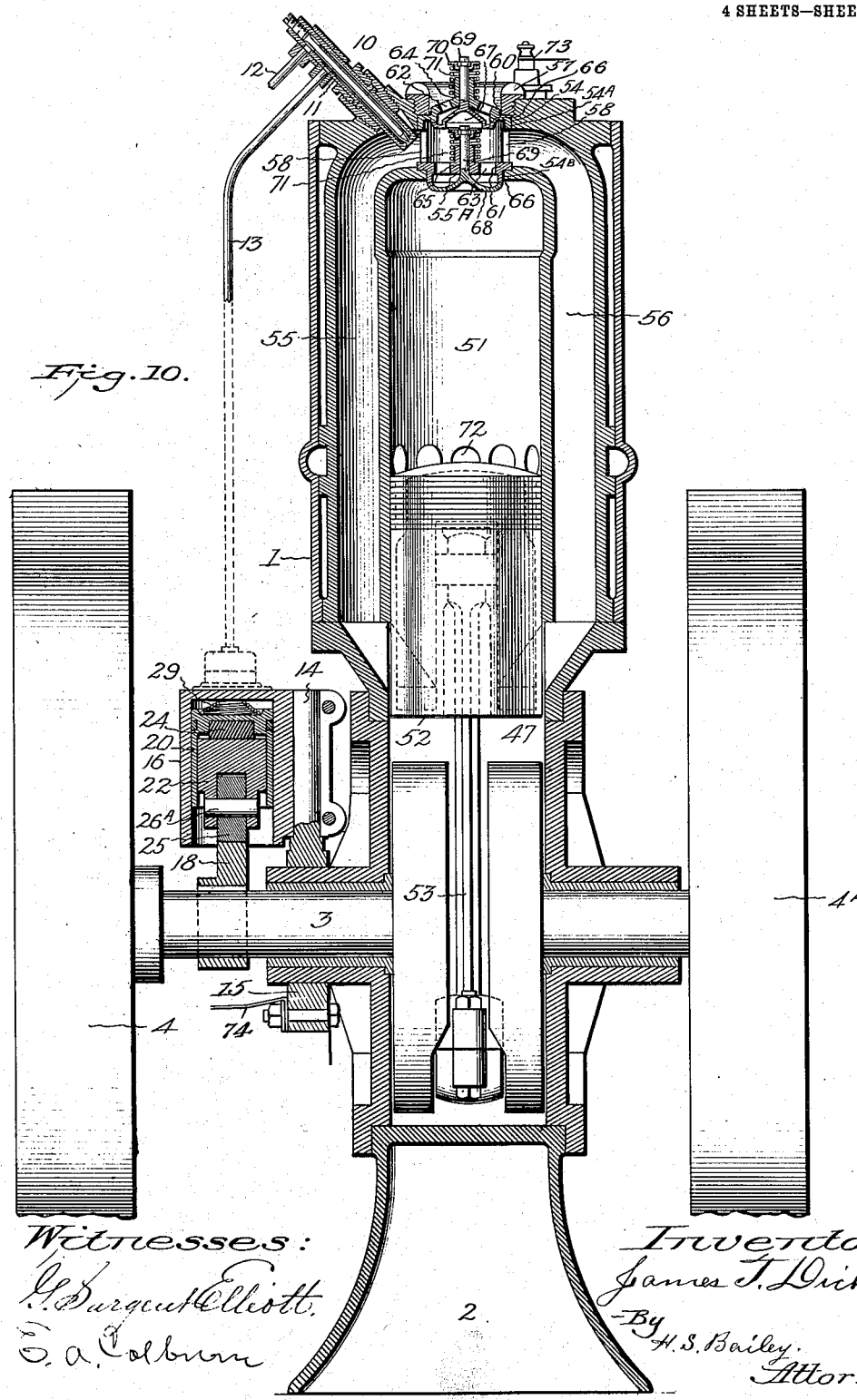

J. T. DICKSON.
CONTROL AND FUEL FEEDING DEVICE FOR INTERNAL COMBUSTION ENGINES.
APPLICATION FILED SEPT. 28, 1907.
899,715.
Patented Sept. 29, 1908.
4 SHEETS—SHEET 1.
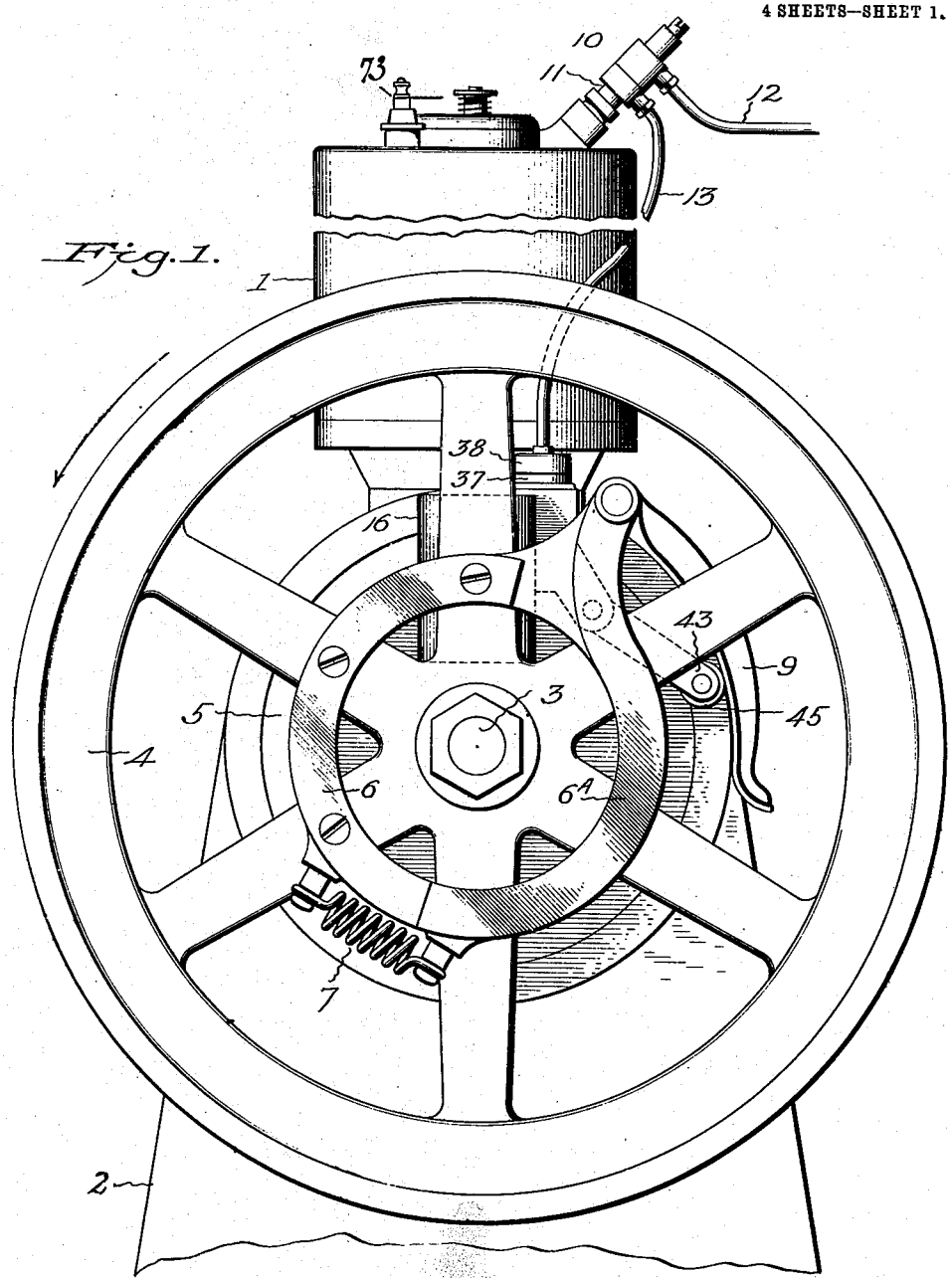

J. T. DICKSON.
CONTROL AND FUEL FEEDING DEVICE FOR INTERNAL COMBUSTION ENGINES.
APPLICATION FILED SEPT. 28, 1907.
899,715.
Patented Sept. 29, 1908.
4 SHEETS—SHEET 2.
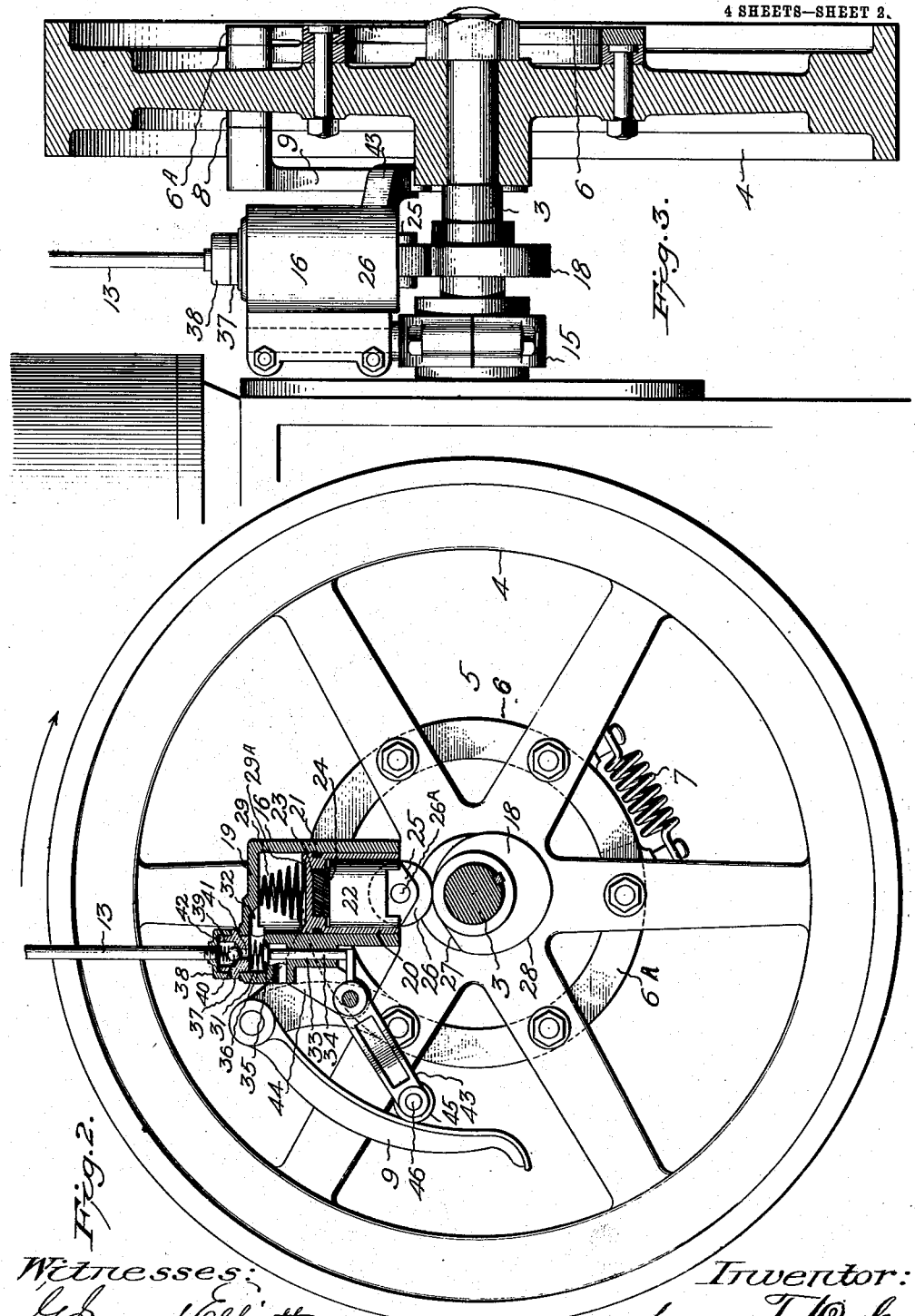

J. T. DICKSON.
CONTROL AND FUEL FEEDING DEVICE FOR INTERNAL COMBUSTION ENGINES.
APPLICATION FILED SEPT. 28, 1907.
899,715.
Patented Sept. 29, 1908.
4 SHEETS—SHEET 3.
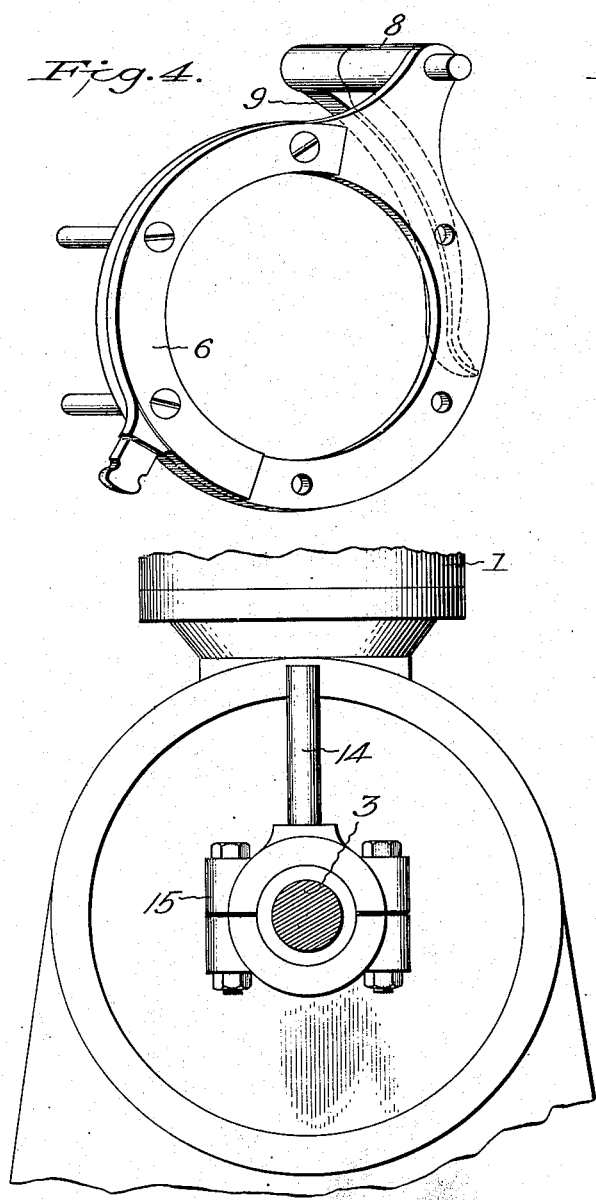
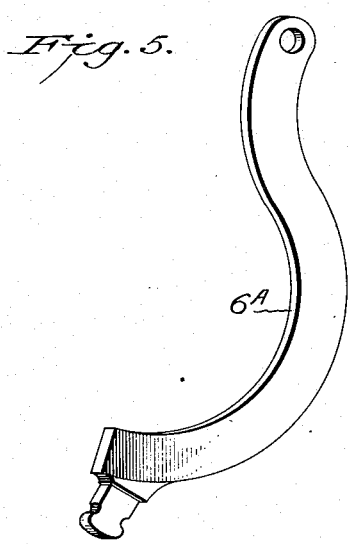
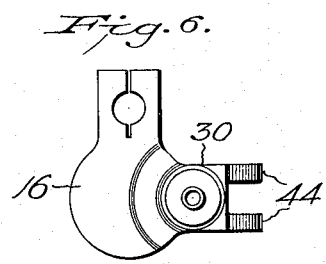
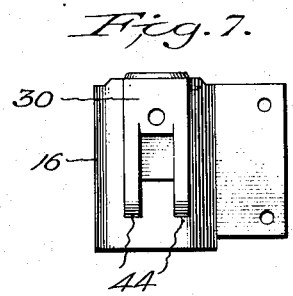
Witnesses:
G. Sargent Elliott.
C. W. Osborn.
Inventor:
James T. Dickson.
By H. S. Bailey, Attorney.

UNITED STATES PATENT OFFICE.

JAMES T. DICKSON, OF DENVER, COLORADO, ASSIGNOR OF ONE-HALF TO E. A. COLBURN, OF DENVER, COLORADO.

CONTROL AND FUEL-FEEDING DEVICE FOR INTERNAL-COMBUSTION ENGINES.

No. 899,715. Specification of Letters Patent. Patented Sept. 29, 1908.

Application filed September 28, 1907. Serial No. 394,982.

*To all whom it may concern:*

Be it known that I, JAMES T. DICKSON, a citizen of the United States of America, residing in the city and county of Denver and State of Colorado, have invented a new and useful Control and Fuel-Feeding Device for Internal-Combustion Engines, of which the following is a specification.

My invention relates to the control of an internal combustion engine by varying the depth of the combustible mixture, commonly known as the stratifying principle.

The objects of my invention are: First, to produce a stratum or layer of combustible gas corresponding to the load applied to the engine, said stratum always being adjacent to the head end of the cylinder, and extending toward the top end of the piston, the intervening space between the gas and the top of the piston containing pure air when working at partial load. Second, to produce high efficiency in an internal combustion engine when working under partial load by maintaining the maximum compression through the varying loads on the engine. Third, to produce a mechanism for producing these results without the use of compressors or reservoirs containing combustible mixtures. And fourth, to provide means for maintaining a constant and even compressive medium in the head or explosive mixture feeding in end of the cylinder for the rearward or backward or upward strokes of the piston, as the case may be, independent of the varying speeds and unequal loads of the engine, and at the same time of providing means by which a variable supply of explosive gasolene and air is fed automatically to the cylinder and is governed by the fluctuations in the speed of the engine's governor, due to the fluctuations in the weight or load thrown on the engine while in operation, the variable supply of explosive gas being an increased or a diminished amount of the normal predetermined supply necessary to operate the engine under its normal load and speed. I obtain these results by the use of the following mechanism illustrated in the accompanying drawings, in which:

Figure 1, is a front elevation of an internal combustion engine fitted with my improved control and working in connection with a centrifugal governor. Fig. 2, shows a section through the timing device which supplies a varying quantity of air to the atomizer; also the connection of said device with the governor through a lever connected with the valve, and shows how said varying quantity of air is admitted. Fig. 3, is a side elevation of the same showing connection with the engine and its fly wheel, and containing the governor in section. Figs. 4 and 5 are perspective views showing the parts constituting the governor. Fig. 6, is plan of the cylinder which supplies air to the atomizer. Fig. 7, is side elevation of same. Fig. 8, shows the clamp which secures the air cylinder to the shaft bearing of the engine. Fig. 9, is a plan view of the governor operated rock arm. And Fig. 10, is a sectional elevation of an engine, arranged to maintain a maximum compression under varying loads and speeds, the atomizer being shown on the side next to the fly-wheel for purposes of convenience in sectioning.

Similar letters of reference refer to similar parts throughout the several views.

Referring to the drawings: The numeral 1 designates the engine cylinder; 2, the engine base; 3, the crank shaft; 4, the flywheel. A centrifugal governor 5 is attached to the flywheel, which comprises the fixed ring 6, the swinging arm 6$^A$, and the spring 7, which normally holds the arm 6$^A$ against outward movement.

The weight 6$^A$ and its spring 7 form parts of a well known type of governor, and do not form part of my invention, but are used in connection therewith.

A lug 8 is formed on ring 6 diametrically opposite from spring 7, on which governor weight 6$^A$ and lever 9 are pivoted, being rigidly secured to each other.

The top of the cylinder is provided with a gasolene atomizer 10. This is a common form of atomizer wherein a spray is formed by the kinetic energy of a volume of air rushing through a small aperture surrounding a nozzle through which gasolene or other liquid may flow, and is different from the more common atomizer in so much as it works from pressure of air applied rather than from the differential pressure caused by suction of the piston of the engine.

The atomizer consists of a plug-shaped tube 11, and is connected with a gasolene supply pipe 12, that extends to the reservoir of fuel, and a pipe 13, which leads to the small air pump and timer.

The air pump and timer consist of a cylinder 16, which is secured to a pin 14 of a two part clamp 15, which is clamped to the hub of the crank shaft journal, and between the crank case and the flywheel.

The governor ring and piston are secured to the outside of the flywheel, and the lever 9 is positioned on the inside of the flywheel close to the spokes, the lug 8 extending through the flywheel far enough to permit the lever 9 to pass close to the air cylinder 16, which is consequently out of the rotary path of the lever 9, which with the ring rotates with the flywheel.

Upon the crank shaft 3 of the engine below the air cylinder, or other part rotating with the engine, I mount and secure a cam 18.

The cylinder 16 is open to the atmosphere at its lower end, and is closed by a head 19 at its upper end. In the bore of this cylinder I snugly fit to reciprocate therein a hollow piston 20, which I term the main piston, and which is open at its lower end and is provided with piston rings 21. Within the bore of piston 20 a piston 22 is fitted, which I term the supplementary piston.

In the under side of the head of the main piston, a counterbored recess 23 is formed, of smaller diameter than its main bore, in which a buffer 24 is placed. This buffer compresses a disk of any suitable material, preferably cork, which is secured in its recess by suitable means, preferably by being tightly pressed therein. This buffer extends far enough below the recess 23, to be engaged by the supplementary piston. The lower end of the supplementary piston is provided with a pair of depending lugs 25, placed far enough apart to admit a roller 26 between them. This roller is mounted on a pin 26ᴬ, that extends through the lugs 25, and the roller extends below the lugs and bears on the periphery of the cam. The cam is provided with a hub portion which is secured to the crank shaft, and the cam is provided at one part of its peripheral surface with a short flat portion 27, which is formed close to its hub portion, and from which an eccentric portion 28 extends to and beyond the opposite side of the hub, and far enough to move the roller 26 and supplementary piston the full length of the stroke of the supplementary piston in main piston 20 and in the cylinder 16.

On the upper end of the cylinder 16 is a conical spring 29, the base coil of which rests in a circular recess 29ᴬ formed in the top of the piston 20, and this spring is made long enough to bear with its apex against the cylinder head, with an expansive resilient pressure, when the main piston is at the lower end of its downward stroke.

The air cylinder is provided with a valve chest lug 30, which is provided with a valve chamber 31, which connects by a port 32 with the piston bore of the cylinder, and from the valve chamber a valve stem aperture extends to the atmosphere. A valve seat is formed between the valve chamber and the valve stem aperture, and a valve stem 34 is slidably mounted in the valve stem aperture, which extends through and beyond the aperture a short distance. The inner end of this stem is provided with a valve 35, which fits and is seated in the said valve seat.

An inverted expansive conical spring 36, is placed within the valve chamber, which bears on the top of the valve 35 and against the lower end of the valve cage nipple 37, which forms the upper wall of the valve chamber at this point, and which is screwed into an aperture formed through the top of the cylinder in line with the axial center of the valve stem. This valve cage nipple is provided with a wrench receiving shoulder, which is screwed against the top of the cylinder, and with a threaded upper end which is provided with a cap 38 that is screwed into it. This valve cage nipple is provided with a valve chamber 39 in which a ball valve 40 is placed, and with a port 41 extending from the valve chamber of the nipple to the valve chamber of the cylinder.

A washer 42 is placed against the top of the inside of the cap 38, and an expansive spring is placed in the valve chamber of the nipple to bear with one end against the ball and the other end against the washer. The cap and the washer are provided with axle apertures, and the pipe 13 is threaded to the cap and extends to the atomizer in the top of the engine cylinder.

The free end of the valve stem is engaged by one end of a rock arm 43, which is pivotally supported between the ears 44, which project from the lug 30 of the cylinder 16. A stud pin passes through the ears and through the arm. The opposite end of this rock arm is bifurcated to form a pair of lugs or ears between which a roller 45 is pivotally mounted on a pin 46, which extends through and is secured to the lugs of the rock arm. This rock arm is so positioned that its roller 45 will stand in the path of the lever 9 of the governor on the fly-wheel, when this lever is rotating at a normally slow speed or at rest.

The engine comprises a suitable supporting base 2, a disk crank shaft housing chamber 47 mounted on said base, a disk crank shaft 3 mounted in said chamber, fly wheels 4 and 4ᵃ mounted on the opposite ends of said crank shaft, and a cylinder 1, mounted on the crank chamber. The cylinder is provided with a piston bore 51, a piston head 52 is reciprocally mounted in the piston bore, and a connecting rod 53 operatively connects the piston head to the wrist pin of the crank shaft. The cylinder 1, is open at its lower end into the crank shaft chamber, and the piston on its down stroke extends a short distance into the top portion of the crank chamber which is formed to receive it. The top cylinder head portion of the cylinder is provided with a central aperture 54, which extends through it into the cylinder. This aperture intersects two ports 55 and 56, which are formed in the shell of the cylinder head portion of the cylinder, and which extend in opposite directions from it to the shell of the cylinder down through which they extend to the lower end of the cylinder, where they extend through the shell of the cylinder into its piston bore 51, adjacent to the top of the crank chamber. The aperture 54, is preferably made in two diameters. The upper portion $54^A$, through the outside shell of the cylinder head, is the larger and the portion $54^B$, that extends from the ports through the head into the piston bore of the cylinder, the smaller.

The upper part of the upper portion $54^A$ of the aperture, is interiorly threaded, and in the lower portion of the upper aperture and also in the lower portion $54^B$ of the aperture, a valve cage $55^A$ is fitted. This valve cage is provided with a shoulder adjacent to its lower end portion that rests on top of the shell portion at the bottom of the ports 55 and 56, and a cap 57 is screwed into the upper part of the upper portion $54^A$ of the aperture against the top of the cage, and thus securely clamps it in the aperture. This valve cage is a hollow cylindrical sleeve, the shell of which is provided with oppositely arranged apertures 58, that are positioned to register with the ports 55 and 56. This valve cage is provided with two valve seat diaphragms 60 and 61, which extend across the opposite end portions of the cage. The valve seat diaphragm 60 is positioned across the cage above the ports 55 and 56, and is provided with ports 62, that form air inlet ports from the atmosphere into the passageways 55 and 56, and the valve seat diaphragm 61 extends across the cage below the passageways 55 and 56, and contains ports 63, that form air inlet ports from the passageways 55 and 56, into the piston bore of the cylinder. The valve seats 60 and 61 of the valve cage are each provided with a hub portion, which projects vertically upward from the top part of the valve seat portions of the cage, and these hub portions are provided with axial apertures 64 and 65. The valve seat diaphragms are each provided with a slightly depending circular valve seat lug portion 66, which portions are formed on their lower sides, and these valve seats are engaged by disk valves 67 and 68, which are each provided with a stem portion 69, that projects loosely and slidably up through and beyond the hub portions of the valve seat diaphragms. A cap 70 is secured to the top of each valve stem, and a coiled expansive spring 71 is placed around each hub and bears with an expansive pressure at one end against the cap and at its opposite end against the diaphragm, thus holding the valves up against the valve seats with a constant resilient pressure.

The atomizer 10 is threaded to an aperture formed in the top of the cylinder in a position to deliver the explosivei mxture into the passageway 55, close to the cylinder inlet valve 68.

The operation of my gasolene engine control is as follows: The engine crank shaft and flywheel rotate in the direction of the arrow; the governor's lever and the air cylinder rock arm are so related to the normal or average load of the engine that the governor under such load, always moves the lever arm outward by centrifugal force to a point representing a part, say for example one-half of its centrifugal force movement, and at this position engages the air inlet rock arm to open the air valve rock arm at each revolution of the flywheel, and moves air valve far enough to supply enough air to the atomizer to furnish a charge of gasolene vapor sufficient to operate the engine at its normal load and mean speed, but when the load is increased and the engine is slowed down slightly, the governor lever moves inward toward the axial center of the crank and engages the rock arm sooner and moves it inward farther and thus opens the air valve wider and admits more air for the atomizer and thus increases the thickness of the gas stratum in the engine cylinder.

The air cylinder operates to force the air to the atomizer in the following manner: When the roller of the rock arm is engaged by the governor's lever, it causes the opposite end of the rock arm to engage and raise the valve stem 34 and the air inlet valve, which allows the atmospheric air to rush into and through the valve chamber into the piston bore of the cylinder above the main piston, where there is a vacuum suction which naturally exerts a lifting pull on the main piston of the cylinder. The conical spring exerts a downward pressure on the main piston, and if the speed of the engine is so slow that the air valve is opened wide by governor, the conical spring is strong enough to cause the main piston to follow the supplementary piston, as air enough will be admitted to completely fill the cylinder above the main piston and destroy its vacuum; but when the engine is running at such a high speed that the governor lever is thrown outward so that it touches and slightly engages and moves the valve actuating rock arm just enough to slightly open it, only a little air is admitted to the cylinder and the vacuum in the cylinder is but partially destroyed, allowing a proportional movement of the main piston from the downward force applied by the conical spring. The movement of the main piston depends on the balance between the conical spring and the vacuum. The amount of air that is admitted to the cylinder depends on the distance the air inlet valve is opened or raised from its seat. The coöperative relation is such that when the main and supplementary pistons shall be at the lowest end of their strokes, and consequently the roller of the supplementary piston bearing on the approach of the flat portion 27, on the surface of the cam, or at the beginning of the cam's stroke, the inlet air valve is closed against its seat. The cam as it rotates with its shaft forces the supplementary piston upwards, and in pushing against the main piston raises it also. The air that has flown into the cylinder through the inlet valve is forced through inlet valve 40, and forces the air through the pipe 13, into the atomizer at the top of the engine cylinder. The volume of air that flows into the cylinder above the main piston depends upon the extent of the deflection of the governor lever, due to the centrifugal force depending on the speed of the flywheel. If this speed is increased, due to a lighter than normal load being applied to the engine, the lever is moved outward and engages the rock arm of the air inlet valve with less deflection and for a shorter period of time as it passes over it, which results in opening the air inlet less and admitting a smaller amount of air to the cylinder. The conical spring in the cylinder is strong enough to accelerate the inrush of air, but not strong enough to overcome the vacuum of the cylinder when the valve is closed. Thus the movement of the main piston is controlled by the amount of air admitted by the inlet valve; consequently the supplementary valve falls by gravity and follows the converging surface of the cam and then the diverging surface raises the supplementary piston first striking the main piston and buffer 24, and then moving it the amount it has descended, at the same time forcing the air that has entered through inlet valve, through discharge valve and then through pipe to atomizer.

When the engine is running under a normal load at a regular speed, the governor lever and the rock arm are so coöperatively adjusted that they open the air inlet valve to the extent that the air cylinder is partially filled at each explosive stroke of the engine, allowing a margin of stroke for heavier loads. Consequently, if the valve is opened but a trifle, the amount of air in the cylinder above the main piston is small, and when forced through the atomizer by the upward stroke produces only a very thin stratum of explosive mixture in the explosive cylinder of the engine, the remaining space between the top of the piston head and the upper end of the explosive cylinder being filled with pure atmospheric air, thereby automatically reducing the speed of the engine to normal by reducing the charge of explosive mixture. But when a heavy load is applied to the engine, the air valve is opened to admit a larger quantity of air to enter air cylinder, which, when being displaced, produces a jet around the nozzle of the atomizer for a longer period of time, producing a deeper stratum of explosive mixture in the explosive cylinder of the engine, in this way keeping the engine at its normal speed.

The engine's explosive cylinder takes in pure atmospheric air, and it is used to form a constant compressive medium, independent of the varying loads and speeds of the engine, in the following manner: When the piston makes its upward stroke in the explosive cylinder of the engine, it forms a suction strong enough to draw the valve 67 open, and admit atmospheric air into the passage ways 55 and 56, which supply of air flows down through these passageways into the crank chamber, and follows the piston head up into the lower end of the explosive cylinder, thus filling the crank chamber at the lower portion of the explosive chamber with atmospheric air. Then when the piston makes its down stroke, the atmospheric air is compressed, which closes the valve 67 and drives the air back through the passage ways 55 and 56, and forces it through the valve 68 into the explosive cylinder. Consequently when the piston reaches the end of its downward stroke, the space between its upper end and the top of the explosive cylinder is filled with atmospheric air, which is compressed by the piston on its up stroke, and the charge of explosive air, or stratum of gas, is forced from the atomizer into the passageway 55 and flows into the explosive cylinder, also through the valve 68, and forms a stratum of explosive gas above the atmospheric air and between it and the top of the cylinder, where it is closest to the igniting mechanism of the engine. Consequently, the piston head of the explosive cylinder always draws in atmospheric air enough to form a constant compressive cushion on the backward stroke of the piston head, regardless of the speed or load on the engine; and also regardless of the stratum of explosive gas fed to the explosive cylinder. Then after each explosion the spent gas follows the piston head to the exhaust ports 72, and exhausts through them from the cylinder, and the atmospheric air flows into the cylinder to take its place. The igniting mechanism comprises the usual plug 73, and a spring arm 74, which is adjustably secured to the two-part clamp 15, in position to be engaged by the highest point of the cam 18, as it revolves. The spring and plug are operatively connected by wires, with a source of electric current supply. Thus it can be seen that while the engine cylinder is filled with air at each intake stroke, equaling the piston displacement, the part of this volume of air which will be charged with gasolene vapor varies with the load applied to the engine; and as the spring over the outlet valve of the air cylinder is set at a certain tension the time that pressure will overcome this tension and pass to the atomizer will grow later as the volume of air in the air cylinder diminishes, thus always placing that part of the air in the engine cylinder which is charged with explosive vapor at the point nearest the intake of said engine cylinder, and at such point the vapor or gas is ignited. Thus it will be seen that no matter how small the portion of air charged, it will always be near the ignition device. It will be further seen that as there is no throttling at any time, the compression always remains the same during the varying loads. The maximum heat efficiency is maintained at all times, producing an economical engine.

My invention is simple and thoroughly reliable, and can be easily and quickly applied to internal combustion engines, and while I have illustrated the preferred construction of my engine, I do not wish to be limited to the construction and arrangement shown and described, as changes might be made without departing from my invention.

Having described my invention, what I claim as new and desire to secure by Letters Patent, is:

1. An automatic control and fuel feeding device for internal combustion engines, the combination of the engine, the crank shaft, the flywheel, the governor, the atomizer, with an air cylinder mounted on said engine, an air inlet valve in said cylinder controlled by said governor, an air exhaust valve in said cylinder connected to said atomizer, a balanced reciprocal piston in said cylinder spring-controlled in its air receiving direction of its reciprocal movement, a supplementary piston arranged to move said balanced piston on its air compressing stroke, and means connected with said engine for operating said supplementary piston.

2. An automatic control and fuel feeding device for internal combustion engines, the combination of the engine cylinder, the crank shaft, the atomizer, and the flywheel, provided with a centrifugal governor, of an air cylinder secured to said engine and provided with an open end, an air inlet valve arranged to be controlled by said governor and with a discharge valve to said atomizer, a main piston to said cylinder, a spring between said piston and head of said cylinder, a supplementary piston within said main piston extending below the open end of said cylinder, and a cam on said crank shaft in engagement with said supplementary piston.

3. An automatic fuel feeding device for internal combustion engines, the combination with the cylinder, the crank shaft, the flywheel, the governor, the atomizer of a gasolene engine, of a cylinder provided with a spring actuated vacuum controlled reciprocating air compressing piston, a supplementary piston depending from said cylinder, a cam on said crank shaft in engagement with supplementary piston, an air inlet valve in said cylinder, a rock arm arranged in engagement with said air valve and said governor adapted to control said air valve, and a pipe connecting said air discharge valve with said atomizer.

4. In an automatic fuel feeding device for internal combustion engines, the combination of the engine cylinder, the crank shaft, the flywheel, the centrifugal governor, and the atomizer, with the air compressing cylinder with an air delivery pipe attached to said atomizer, an air inlet valve in said air cylinder, a spring arranged to hold said valve normally closed, a rock arm in engagement with said valve at one end and arranged in the rotative path of and adapted to be engaged and operated by the variable speed positions of said governor to admit air to said air cylinder, and means including a cam on said crank shaft for compressing air in said cylinder and forcing it into said atomizer.

5. In an automatic control and fuel feeding device for internal combustion engines, the combination of the atomizer, the crank shaft and the flywheel, of an operative internal combustion engine, said flywheel being provided with a centrifugal governor, with an air cylinder secured to said engine, the pistons reciprocally mounted in said cylinder, means including cam on said shaft for operating said piston, the air inlet and discharge valves, the air pipe extending from said cylinder to said atomizer, a rock arm pivotally supported by said air cylinder intermediate of its ends, having one end in engagement with said air inlet valve, a roller in the opposite end of said rock arm, and a lever on said governor arranged to stand with varying eccentricity to flywheel's axial center and varying its contact with rock arm's roller by the centrifugal movements of the governor arm.

6. In an automatic fuel feeding device for internal combustion engines, the combination with an engine provided with a crank shaft, a flywheel, an atomizer, and a centrifugal governor provided with an arm arranged to be moved by centrifugal force, an air receiving and discharging cylinder supported in operative relation to said engine, an air inlet valve in said cylinder spring-controlled to stand normally closed against the admittance of air to said cylinder, an air discharging valve in said cylinder, spring-controlled to stand normally closed against the discharge of air from said cylinder, a pipe connected to said cylinder adjacent to said discharge valve at one end and connected to said atomizer at its opposite end, a lever in engagement with said inlet valve at one end and arranged to be engaged by said governor's movable arm to open said valve by its centrifugal force movement, a free movement air piston reciprocally mounted in said cylinder spring-controlled on its air receiving stroke, said piston subject to a vacuum suction force counteracting its spring-actuated movement, and reciprocative means moving said piston against its spring to displace and force air through said discharge valve to said atomizer.

7. In an automatic fuel feeding device for internal combustion engines, the combination of the engine, the atomizer and the governor, with an air cylinder in operative relation to said engine, provided with an open and a closed end, an operative reciprocating air compressive piston in said cylinder, a conical expansive spring between the closed end of said cylinder and the adjacent end of said piston, said piston being arranged to be subject to the vacuum suction of the closed end of said cylinder, an axial bore in opposite end of said piston from said conical spring, a supplementary piston reciprocally mounted in said piston's axial bore, a buffer secured in the axial bore of said piston adapted to be engaged by the adjacent end of said supplementary piston, said supplementary piston being arranged to extend through the open end of said cylinder, a roller rotatably mounted in the open end of said supplementary piston and a cam adapted to move said supplementary piston to engage and move said main piston against its spring and against its air discharging stroke, and means including an air inlet valve operatively arranged to be controlled by the variable speed of the engine by means of the governor for admitting air to said cylinder, and means including a discharge valve and a pipe connecting said cylinder to said atomizer for discharging the air displaced from said cylinder to the atomizer.

8. In an automatic fuel feeding device for internal combustion engines, the combination of an operative engine provided with a rotating governor, and a gasolene atomizer, of an air compressing cylinder, a spring and vacuum balanced piston reciprocally mounted in said cylinder, an independent supplementary piston arranged to move said balanced piston to displace air in said cylinder, a cam connected to said engine and arranged to move said supplementary piston to operate said balanced piston on its operative air displacing stroke, a valve chamber in said cylinder, a discharge outlet in said valve chamber, a valve seated in the discharge outlet, a spring arranged to normally hold said valve closed, an air inlet valve in said valve chamber, a spring arranged to hold said air inlet valve closed, a lug on said cylinder, a rock arm pivotally secured to said lug intermediate of its ends, a stem on said air inlet valve extending from said cylinder and in engagement with one end of said rock arm, a roller pivotally attached to the opposite end of said rock arm, a centrifugal force operated lever attached to said governor arm, arranged to engage the roller of said rock arm as it rotates and open said valve in proportion to its centrifugal force movement.

9. In an automatic fuel feeding and regulating device for internal combustion engines, the combination with the engine shaft, a flywheel thereon, a centrifugally operated governor arm secured to said wheel, and a cam on said shaft, of a cylinder secured above said cam, open at its lower end; a plunger in said piston having a roller which is engaged by said cam, a projection on said cylinder having a valve chamber communicating with the cylinder at its upper end, a valve in said chamber which normally closes an air inlet, and which is provided with a depending stem; a pivot rock arm, one end of which engages said stem while the other is in the path of the centrifugally operated governor arm; a chamber connecting an inlet and an outlet valve chamber, a spring controlled outlet, and a pipe leading from said outlet.

10. An automatic speed control and constant compression maintaining internal combustion engine, comprising an operative combustion cylinder, provided with a reciprocative piston and operative valve controlled ports connected with the combustion cylinder and the piston's reciprocative movement, an atomizer connected to the combustion end of said combustion cylinder, a governor on said engine, an air receiving and discharging cylinder arranged in operative relation to said cylinder and governor, and connected to said atomizer, an air inlet valve in said air receiving cylinder arranged to be controlled by the speed fluctuations of said governor to automatically admit variable supplies of air to said air cylinder, a reciprocating piston in said cylinder, and a free movement piston in said cylinder spring-controlled in one direction of its movement and adapted to admit strata of air of variable thicknesses to said cylinder in the path of said reciprocating piston, whereby said variable strata of air are compressed and forced through said atomizer into said combustion cylinder.

In testimony whereof I affix my signature in presence of two witnesses.

JAMES T. DICKSON.

Witnesses:
E. A. COLBURN,
J. C. HELM.